United States Patent
Ewald et al.

(10) Patent No.: US 10,639,668 B2
(45) Date of Patent: May 5, 2020

(54) DEVICE AND METHOD FOR TREATING THE SURFACES OF MOULDED PARTS

(71) Applicant: DyeMansion GmbH, Planegg (DE)

(72) Inventors: Felix Ewald, Donaueschingen (DE); Philipp Kramer, Munich (DE)

(73) Assignee: DYEMANSION GMBH, Planegg (DE)

( * ) Notice: Subject to any disclaimer, the term of this patent is extended or adjusted under 35 U.S.C. 154(b) by 253 days.

(21) Appl. No.: 15/443,405

(22) Filed: Feb. 27, 2017

(65) Prior Publication Data

US 2017/0246652 A1    Aug. 31, 2017

Related U.S. Application Data

(63) Continuation of application No. PCT/EP2015/069805, filed on Aug. 28, 2015.

(30) Foreign Application Priority Data

Aug. 29, 2014   (DE) .................. 10 2014 112 508

(51) Int. Cl.
| | |
|---|---|
| *B05C 3/00* | (2006.01) |
| *B05C 3/109* | (2006.01) |
| *B05C 3/04* | (2006.01) |
| *B05C 19/04* | (2006.01) |
| *B33Y 10/00* | (2015.01) |
| *B33Y 80/00* | (2015.01) |

(Continued)

(52) U.S. Cl.
CPC .............. *B05C 3/109* (2013.01); *B05C 3/005* (2013.01); *B05C 3/04* (2013.01); *B05C 19/04* (2013.01); *B05D 1/18* (2013.01); *B33Y 10/00* (2014.12); *B33Y 80/00* (2014.12); *B08B 3/04* (2013.01)

(58) Field of Classification Search
None
See application file for complete search history.

(56) References Cited

U.S. PATENT DOCUMENTS

| | | | | |
|---|---|---|---|---|
| 723,795 A | * | 3/1903 | Willard | ............... D06B 5/00 68/187 |
| 2,038,260 A | | 4/1936 | Ash | |

(Continued)

FOREIGN PATENT DOCUMENTS

| | | |
|---|---|---|
| DE | 10 60 832 B | 7/1959 |
| DE | 17 85 623 A1 | 5/1973 |

(Continued)

OTHER PUBLICATIONS

English translation of a German Office Action issued for German Patent Application No. 10 2014 112 508.8 dated May 6, 2015.

(Continued)

Primary Examiner — Charles Capozzi
(74) Attorney, Agent, or Firm — Myers Wolin, LLC (57) ABSTRACT

A device and method is provided for treating surfaces, in particular for colouring moulded parts, said device comprising a container for receiving moulded parts and a first cover. The container can be closed, preferably, by using the first cover. A system is also provided for introducing liquid and/or powdery surface treatment agents into an inner chamber of the closed container. The system comprises a capsule in which the surface treatment agents which are to be introduced are accommodated.

13 Claims, 3 Drawing Sheets

(51) Int. Cl.
*B05D 1/18* (2006.01)
*B08B 3/04* (2006.01)

(56) References Cited

U.S. PATENT DOCUMENTS

| | | | |
|---|---|---|---|
| 3,400,726 A * | 9/1968 | De Bernard Du Grail | ................ G01N 1/30 134/95.2 |
| 3,574,561 A | 4/1971 | Nickerson et al. | |
| 3,762,553 A | 10/1973 | Russo | |
| 4,726,318 A | 2/1988 | Yamakita | |
| 2009/0017224 A1 | 1/2009 | Brendel | |
| 2009/0199881 A1 * | 8/2009 | Wilcox | ............... A47L 15/4409 134/57 DL |
| 2010/0000580 A1 * | 1/2010 | Classen | ............... A47L 15/0055 134/93 |
| 2013/0056042 A1 * | 3/2013 | Wipperfurth | ....... A47L 15/4409 134/184 |

FOREIGN PATENT DOCUMENTS

| | | |
|---|---|---|
| DE | 33 02 687 A1 | 8/1984 |
| DE | 10 2006 043 973 A1 | 3/2008 |
| DE | 10 2010 001 101 A1 | 7/2011 |
| DE | 102010001101 A1 | 7/2011 |
| EP | 2 502 542 A1 | 9/2012 |
| WO | 2011/137929 A1 | 11/2011 |

OTHER PUBLICATIONS

International Preliminary Report on Patentability with English translation of the Written Opinion issued for corresponding International Patent Application No. PCT/EP2015/069805 dated Feb. 2, 2017.

Extended European search report issued by the European Patent Office for corresponding European Patent Application No. 18206829.6, dated Mar. 26, 2019, with an English machine translation.

* cited by examiner

DEVICE AND METHOD FOR TREATING THE SURFACES OF MOULDED PARTS

CROSS REFERENCE TO RELATED APPLICATIONS

This application is a continuation of International Application No. PCT/EP2015/069805, filed on Aug. 28, 2015, which claims priority to German Application No. 10 2014 112 508.8, filed on Aug. 29, 2014, the contents of each of which are hereby incorporated by reference herein.

FIELD OF THE INVENTION

The invention relates to a device for surface treatment of molded parts, a capsule for the device, a method for surface treatment of molded parts, as well as the use of a capsule according to the invention in a device for surface treatment. In particular, the invention relates to a device and a method for surface treatment of molded parts, which are produced by means of a powder-based manufacturing or printing method (3D printing method).

PRIOR ART AND BACKGROUND OF THE INVENTION

In prior art, surfaces of molded parts produced by means of a 3D printing method, preferably, are treated manually. Thus, such molded parts, for example, are dyed manually, or are impregnated manually. In order to make the surface treatment more efficient, it is known to put the molded parts to be processed into a container, for example, into a dying pot into which also the dye is introduced. Thereby, several molded parts can be dyed, for example, simultaneously. Usually, molded parts produced in a 3D printing method have to be pre- or post-treated prior and after the dying procedure for which purpose also a corresponding container is provided respectively, in which the pre- or post-treatment steps are carried out.

For a series production of molded parts produced by means of a 3D printing method, this approach, however, is not suitable. On the one hand, for achieving a consistent dye result for a plurality of molded parts, it has to be ensured that the composition of the dye is the same for each dyeing process, on the other hand, the molded parts have to be taken out of the container for pre-treatment into the dye container, and from the dye container into the container for post-treatment manually. Further, for all three treatment steps, it has to be ensured that the respective process parameters remain within certain tolerance limits, and, in fact, over long time periods, if a large number of molded parts has to be processed with a consistent result.

OBJECT OF THE INVENTION

Therefore, it is an object of the present invention to provide solutions allowing for the surface treatment of molded parts, in particular, in a powder-based manufacturing or printing method (3D printing method), to be made more efficient, and, in particular, allowing for a surface treatment of such molded parts on an industrial scale, in particular, in series production, wherein at the same time, a consistent treatment result is to be ensured.

Solution According to the Invention

According to the invention, this object is solved according to the independent claims by a device for surface treatment of molded parts, by a capsule, in particular, for use in a device according to the invention, by a method for surface treatment of molded parts, as well as by the use of the capsule according to the invention in a dying device according to the invention. Preferred embodiments and further developments of the invention can be derived from the respective dependent claims.

Accordingly, a device for surface treatment, in particular, for dying of molded parts is provided, comprising
  a container for receiving a number of molded parts to be treated,
  a first cover, wherein the container preferably can be closed by means of the first cover in a pressure-, fluid-, and/or air-tight manner, and
  an arrangement for introducing liquid and/or pulverized surface treatment agents into an inner space of the closed container, wherein
    the arrangement comprises a capsule and an application means,
    the surface treatment agents to be introduced are received within the capsule, and
    the application means can be coupled to the capsule in order to apply a gas and/or a fluid to at least one chamber formed in the capsule, in order to bring or to introduce the surface treatment agent received within the capsule into the inner space of the container.

The device is particularly suitable for dying of molded parts made from plastics, sand, and/or plaster produced in a powder-based manufacturing or printing method (3D printing method). Further, an industrial surface treatment, in particular, dying of molded parts produced by means of a 3D printing method, is enabled for the first time by this device, which is specifically advantageous for series production.

The gas and/or fluid introduced into the capsule causes the surface treatment agent being present in the capsule to escape from the capsule and to pass into the inner space of the container.

By providing one or more capsules, in which the surface treatment agent is received, it is avoided that the surface treatment agent has to be introduced into the container directly. Only the capsule with the surface treatment agent has to be put into the container. Thereby, the use of prefabricated capsules is enabled ensuring a consistent treatment result, also for several dying processes.

The capsule may be arranged within the inner space of the container. The capsule may be configured as a storage container.

The application means may comprise at least one supply line, in order to supply the gas and/or fluid to the at least one chamber of the capsule, wherein the supply line is guided through a wall of the container or through the first cover in the inner space of the container.

It is preferable, if
  the inner-space-sided end of the supply line is configured as a nozzle, or
  at least one nozzle is arranged within the inner space of the container, wherein the nozzle is or may be coupled to the supply line,
  wherein the nozzle is adapted to penetrate through or to pierce a wall of the capsule, if the capsule is pushed against the nozzle.

According to an embodiment of the invention, the inner-space-sided end of the supply line may be coupled to inlet openings of the capsule.

The capsule mount may be formed in the first cover, and may form an accommodation space for receiving the capsule.

A second cover may be assigned to the capsule mount, by means of which the capsule mount may be closed and/or by means of which the capsule mount is pressed against the opening of the capsule mount, wherein outlet openings of the capsule are facing the opening, wherein the second cover closes the capsule mount in a pressure-, fluid-, and/or air-tight manner, and/or the capsule pressed against the opening closes the opening in a pressure-, fluid-, and/or air-tight manner.

At the opening of the capsule mount, there may be provided a circumferential sealing ring, against which the capsule arranged within the capsule mount of the cover is pressed.

Between the rim of the container and the first cover, there may be arranged a circumferential sealing ring.

It is advantageous, if the first cover is pivotably arranged at the container. Moreover, it is advantageous, if the second cover is pivotably arranged at the first cover.

The capsule mount may be formed at the first cover such that the accommodation space for receiving the capsule protrudes into the inner space.

Coupling links may be provided at the second cover, in order to connect the compressed-air tubes to the inlet openings of the capsule arranged within the capsule mount during closing of the second cover air and pressure tightly. Thereby, a user only has to introduce the capsule and to close the second cover. Connecting the capsule to the compressor or to the compressed-air tubes manually can be omitted.

According to an embodiment of the invention, the capsule mount may be formed as capsule container with at least one opening, in particular, as a lattice box.

The device according to the invention may comprise a basket for receiving the molded parts introducible into and removable from the inner space of the container. The molded parts may be put into the basket outside of the device, and may then be introduced into the treatment space of the device together with the basket.

The capsule mount or the lattice box may be arranged at the basket, preferably, at the bottom of the basket, particularly preferably, at least partially at the bottom-sided outer surface of the basket. Hereby, the capsule preferably may be arranged in the capsule mount such that it rests at the application means during introducing of the basket into the container, or is pressed against the application means, in particular, against the nozzles.

After the introduction of the basket into the container, the capsule may be spaced apart from the application means. The application means or parts thereof may then be advanced to the capsule.

Hereby, the capsule itself is preferably configured such that pressing against the nozzles effects a penetration or a piercing of the wall of the capsule. By means of the penetration or the piercing, thus, an opening is formed in the in axial direction the capsule wall through which the surface treatment agent may exit from the capsule, and may pass into the inner space of the container, in particular, if gas and/or fluid is supplied to the capsule via the nozzles.

Pressing the capsule against the nozzles may be effected by the first cover, when the cover is closed. Due to the closing of the cover, the basket may be pressed slightly downwards, this in turn, causing the capsule arranged within the capsule mount to be pressed against the nozzles, and the nozzles to penetrate through the bottom of the capsule.

It is advantageous, if the arrangement for introducing the surface treatment agent comprises a compressor, which may be coupled to the capsule, preferably, via the at least one supply line, in order to introduce the gas and/or at the fluid into the inner space of the capsule under a pressure, which is larger than the internal pressure of the container. According to an embodiment, "normal water" from the tab may be the fluid, wherein the available water pressure may be sufficient, where appropriate.

The second cover may comprise a number of pneumatic coupling links, which, on the one hand, may be coupled to the compressor by means of the supply lines, and on the other hand, to the inlet openings of the capsule.

It is advantageous, if at least one nozzle is formed so as to be movable in axial direction. Thereby, the nozzle may, for example, exit from the inlet opening of the capsule after the nozzle has formed the inlet opening by means of penetration of the capsule bottom. Hereby, the nozzle acts as a kind of "needle" for piercing the capsule.

The device may comprise a fluid supply, via which a fluid, in particular water, may be introduced into the inner space, wherein a stop valve may be assigned to the fluid supply, and/or comprise a means by means of which a negative pressure and/or an overpressure may be applied to the inner space.

Advantageously, the device comprises an outlet in order to drain the inner space, preferably, by means of a negative pressure suction means which may be coupled to the drain.

A heating and/or cooling means, preferably, a heating and/or cooling sleeve, may be arranged at the container for heating and/or cooling the inner space. Moreover or alternatively, an external heating and/or cooling means may be provided, in order to heat or cool the fluid within the inner space or to be supplied to the inner space.

The device may comprise a number of sensors, in particular, a temperature sensor, a pressure sensor, and/or a pH value sensor, which are assigned to the inner space.

The device may comprise an agitator, in particular, magnetic agitators, oblique blade agitators, or rod agitators, in order to mix liquid substrate present in the inner space with the surface treatment agent being supplied.

The application means may be adapted to apply gas and/or fluid separately and independently of each other to a number of the chambers formed within the capsule. Thereby, for example, several chambers of the capsule may be opened successively, and the surface treatment agent present in the chambers may be supplied to the inner space successively.

Additionally, the device may comprise a supply means for supplying of cleaning agents to the inner space of the container. The inner space may thus be subjected to cleaning with its cover closed. Then, after the cleaning procedure, the cleaning agent may be discharged from the inner space via the drain. The supply means may comprise a cleaning nozzle or, which according to an embodiment of the invention may be arranged in the sidewall of the container. Further, a cleaning nozzle may be provided in the cover, in order to, for example, supply rinsing water to the container.

At the open ends of the nozzles, i.e. at those ends, which penetrate into the capsule, blades may be arranged, in order to facilitate a piercing of the capsule wall.

The device advantageously comprises a data processing means or may be coupled to a data processing means, wherein the data processing means is coupled operatively to the compressor and/or to the sensors, and is adapted to control the application of fluid and/or gas to the capsule by means of the compressor and/or to monitor the measured values sensed by the sensors.

The volume of the inner space may range between 5000 cm$^3$ and 0.5 m$^3$. For an industrial production on a large scale, however, also larger volumes may be provided.

It is specifically advantageous, if the device comprises a reading means, in particular, a barcode, a QR code, an RFID or an NFC reading means for reading a barcode, a QR code, RFID tags, or NFC tags attached to the capsule. Preferably, the reading means is arranged at the inner side of the second cover or at the side wall of the capsule mount or at a lateral inner wall of the container, and in fact such that the code or the tag may be read or read out at the capsule.

The reading means preferably is coupled to the data processing means and is adapted to transmit the code read, or the data read out from the tag to the data processing means, wherein the code or the data of the tag indicates, which surface treatment agent is present in which one of the chambers of the capsule, and how certain parameters are to be set during the surface treatment. Thereby, the user only has to introduce the molded parts to be treated and the capsule into the container, and to close the cover. On the basis of the data, or on the basis of the codes, the device according to the invention carries out the surface treatment program completely automatically and without manual intervention. Consistent results of the surface treatment, thus, are ensured.

Further, a capsule is provided, in particular, for use in the device for surface treatment according to the invention, wherein the capsule comprises a substantially pressure resistant and fluid-tight housing, at least one chamber is formed in the interior of the housing for receiving a fluid and/or pulverized surface treatment agent, at least one outlet opening is or may be formed in the wall of the housing, wherein the surface treatment agent may escape through the outlet opening, and a fluid and/or gas may be applied to the at least one chamber of the capsule, in order to effect the escaping of the surface treatment agent through the outlet opening.

At least one inlet opening is or may be formed in the wall of the housing, wherein the fluid and/or the gas may be applied to the at least one chamber through the inlet opening.

At least two, preferably, three chambers may be formed in the interior of the housing, wherein each chamber receives a liquid and/or pulverized surface treatment agent, wherein at least one inlet opening and at least one outlet opening is assigned to each chamber, wherein the fluid and/or gas are or may be applied to the chambers independently of each other, and wherein the surface treatment agent may escape from each chamber independently of each other.

Chamber walls may be provided in the housing, which separate the chambers from each other in a fluid- and air-tight manner, wherein the chamber walls preferably consist of a stable material.

According to an embodiment of the capsule, the inlet openings at the same time may be the outlet openings. That means that by piercing the capsule by means of the nozzle, an opening is created in order to supply the fluid and/or gas to the chamber. At the same time, the surface treatment agent may escape from the same opening (outlet opening).

The outlet openings may respectively comprise a locking means, which are adapted to open the outlet openings for an escaping of the surface treatment agent as soon as the pressure exceeds a predetermined value in the respective chamber.

The locking means may be configured as check valves, which open the respective chamber at a certain pressure. Alternatively, the locking means may also comprise membranes, which are destroyed in the respective chamber at a certain pressure.

Alternatively, the locking means may also be configured such that they may be opened independently of the respective pressure in the chamber of the capsule. The locking means may be configured as magnetic valves, which may be activated or deactivated by an external means, for example, a data processing means or a control means. Hereby, it is advantageous, if the respective chambers of the capsules are already pressurized or are pressurized during opening of the valves.

It is advantageous, if at least one portion of the wall of the housing of the capsule is formed as an opening or piercing area, wherein the outlet opening and/or the inlet opening may be created within the opening or piercing area, if the opening or piercing area is formed with a thinner wall than the remaining wall of the housing.

At least one predetermined breaking point may be provided in the opening or piercing area.

A barcode, a QR code, an RFID tag, or an NFC tag may be arranged at the housing of the capsule comprising or storing information on which surface treatment agent is present in which one of the chambers of the capsule, and which process parameters and/or machine parameters are to be set during the surface treatment.

Further, a method for surface treatment is provided, in particular, for dying of molded parts by means of a device according to the invention and a capsule according to the invention, wherein the capsule comprises at least one chamber, wherein a surface treatment agent is received in the at least one chamber, wherein the molded parts are put into the container of the device, and wherein the method comprises the following steps after the capsule been put into an operating state (a) filling the container with a liquid substrate, preferably, water, (b) applying a gas and/or a fluid to a first chamber of the capsule such that the surface treatment agent provided in the first chamber escapes from the first chamber into the inner space.

"Putting into an operation state" means that a desired capsule is introduced into the capsule mount, the cover and the second cover are closed such that the inner space of the device is closed substantially pressure-, fluid-, and air-tightly, and the capsule is connected to, for example, a compressor.

If the capsule has more than one chamber, the step (b) or the steps (a) and (b) may be repeated for each further chamber of the capsule, or the step (b) may be carried out for each chamber of the capsule substantially simultaneously.

Subsequent to the step (b), after elapsing of a predetermined time period, the substrate—surface treatment agent—mixture may be removed from the container in a step (c).

The step (c) is an optional step.

According to the invention, a gas and/or a fluid may be applied to a further chamber of the capsule, in order to effect an escaping of the surface treatment agent from this further chamber without initially removing the substrate—surface treatment agent—mixture comprised in the device from the container.

It may also be provided for carrying out step (a) only once, and repeating only step (b) for the further chambers of the capsules. Thus, it is, for example, possible that the chambers of the capsules are opened during the dying procedure successively in order to allow the respective surface treatment agent to escape from the respective chamber without emptying the device, and wherein step (a) is carried out only once, e.g., at the beginning of the dying procedure.

Prior to and after the application of the fluid and/or gas to the chamber of the capsule, the substrate or the substrate—surface treatment agent—mixture may be heated, preferably by means of the heating and/or cooling means arranged at the container.

As a final step of the method, which may be optional, the molded parts which have been introduced into the container, may be dried, preferably, by means of a drying means arranged at the container, for example a warm air or hot air means, by means of which the inner space of the container may be subjected to warm or hot air.

Further, the use of a capsule for surface treatment according to the invention, in particular, for dying of molded parts is provided, wherein the molded parts for the surface treatment are introduced into a device for surface treatment according to the invention.

BRIEF DESCRIPTION OF THE FIGURES

Further details and features of the invention can be derived from the following description in connection with the drawing, in which.

DETAILED DESCRIPTION OF THE INVENTION

Figure 1:
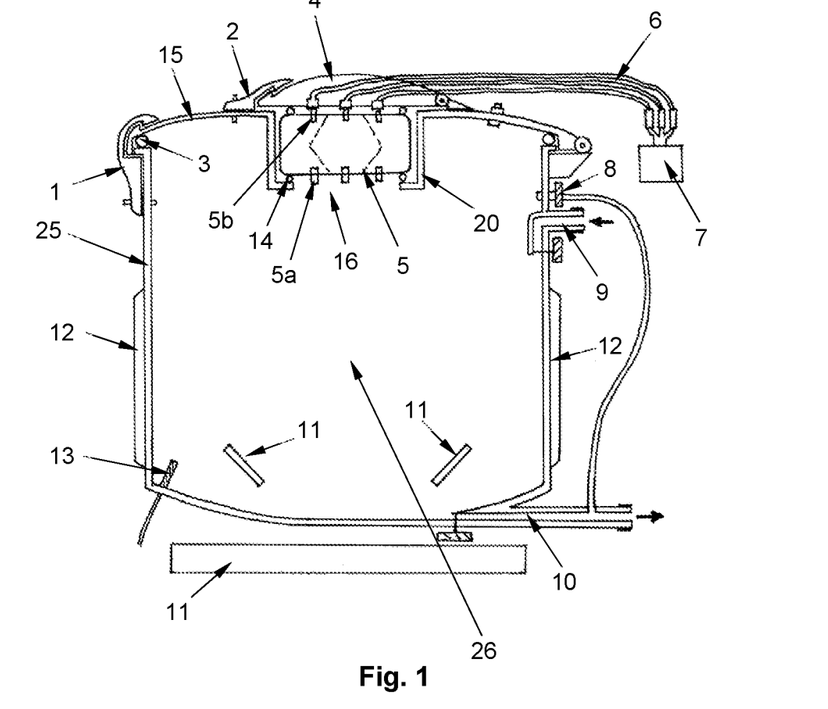
FIG. 1 shows a first embodiment of a device for surface treatment of molded parts according to the invention in a sectional view.

FIG. 1 shows a device V for surface treatment of molded parts in a sectional view.

Here, the device V consists of a container 25, which may be closed with a first cover 15. The first cover 15 is pivotably hinged at the upper edge of the container 25. The first cover 15 and the container 25 are dimensioned such that a pressure of approximately 0.3 bar (negative pressure) up to 2.5 bar (overpressure) can be generated in the interior of the device. For generating the overpressure, a compressor is connected to the device. For generating the negative pressure, the device is connected to a vacuum pump via a valve 8.

The first cover 15 is closed by means of a lock 1. Between the first cover 15 and the upper edge of the container 25, a circumferential sealing is provided ensuring that the cover 15 can be closed in a fluid-, pressure-, and air-tight manner.

According to the embodiment of the device V shown in FIG. 1, a capsule mount 20 is provided in the first cover 15, which here projects into the inner space 26 of the container 25, and in which a capsule 5 may be arranged. The capsule mount 20, here, is closed by a second cover 4, which is pivotably hinged to the first cover 15. Further, the capsule 5 and the second cover 4 are configured or dimensioned such that upon closing of the second cover 4, the capsule 5 is pressed against the bottom of the capsule mount 20. An opening 16 is provided in the bottom of the capsule mount 20, in which the outlet openings 5a of the capsule 5 are arranged or protrude. A surface treatment agent, for example, dye received within the capsule 5 is supplied to the inner space 26 of the container 25 via the outlet openings 5a, as will be described in further detail below.

The opening 16 of the capsule mount 20 has a circumferential sealing 14, on which the capsule 5 rests and against which the capsule 5 is pressed. Accordingly, the capsule or the bottom of the capsule has a larger base area than the opening 16 of the capsule mount 20, i.e., the capsule projects circumferentially beyond the openings 16 of the capsule mount 20. By pressing of the capsule 5 against the sealing 14, it is ensured that the inner space 26 of the container 25 is closed in an air-, fluid-, and pressure-tight manner, as soon as also the first cover 14 is closed.

At the lower side of the second cover 4 or at the surface of the second cover 4 facing the capsule 5, also a circumferential sealing may be provided, which is pressed against the capsule with the cover 4 closed. The sealing, on the one hand, serves for not damaging the capsule 5 with the second cover 4. On the other hand, it serves for the space between capsule 5, the second cover 4, and this circumferential sealing being configured in a substantially air-, fluid-, and pressure-tight manner. In fact, at the upper side of the capsule 5 and within this circumferential sealing, inlet openings 5b of the capsule 5 are arranged, to which supply lines are connected, which here are configured as pressure tubes 6.

The second cover 4 may also be closed by a lock 2, which is arranged at the first cover 15.

At the second cover 4, here, pneumatic couplings are provided, which, on the one hand, are coupled to the inlet openings 5b of the capsule 5 via the pressure tubes 6, and on the other hand, are coupled to a compressor 7. The compressor, here, is shown as an external compressor 7. However, it may also be an integral part of the device V. By means of the compressor 7, the capsule 5 (i.e., the inner space of the capsule 5) is pressurized (overpressure), preferably by means of a gas and/or a fluid. The overpressure thus generated within the capsule 5 causes the surface treatment agent provided in the capsule 5 to escape from the outlet openings 5a of the capsule 5 into the inner space 26 of the container 25. Moreover, the chamber of the capsule may be rinsed by means of the supplied gas and/or fluid such that the surface treatment agent escapes from the chamber completely.

In the embodiment shown in FIG. 1, the capsule 5 has three chambers, which respectively are filled with a surface treatment agent. However, according to the concrete application, also more than three or less than three chambers may be provided. An outlet opening 5a and an inlet opening 5b are assigned to one of the three chambers. According to the invention, gas, for example, pressurized air, and/or a fluid, for example, water, may be applied to each one of the chambers independently from each other such that, for example, the surface treatment agents comprised in the chambers may be supplied to the inner space 26 at certain temporal intervals successively.

Also, several outlet openings 5a and several inlet openings 5b may be assigned to the chambers respectively.

The compressor 7, here, is coupled to a control means or to a data processing means, which controls the compressor such that a gas and/or fluid is applied to the single chambers of the capsule 5 according to a predetermined program sequence, and thereby, are emptied.

The program sequence to be maintained substantially depends on the surface treatment agent present in the chambers of the capsules, and on the material characteristics of the molded parts to be treated. That means, gas and/or fluid have/has to be applied to the chambers, if needed, at different points of time or in a different sequence. For this, barcodes, QR codes, RFID tags, or NFC tags are arranged at the capsule, which may be read by means of a corresponding reading apparatus (not shown here). The reading apparatus may, for example, be arranged at the lower side of the second cover 4 (if the codes or tags are arranged at the upper side of the capsule 5), or at an inner side of a side wall of the capsule mount 20 (if the codes or tags are arranged at a side wall of the capsule 5).

The codes or the tags comprise at least information on which surface treatment agent is present in which one of the chambers of the capsule. Further information, which may be comprised in the codes or tags, and which may be read by means of a reading apparatus, may be:

sequence according to which the chambers are to be pressurized,
pressure/temperature/pH value, which has to prevail in the inner space 26 of the container during emptying of the respective chamber,
minimum/maximum amount of a substrate (e.g., water), which has to be comprised in the inner space 26 of the container,
target values of certain operational parameters of the device V.

According to the concrete application, also further information may be comprised.

The reading apparatus may be coupled to the control means or data processing means, which then may control the device V and the compressor 7 on the basis of the information read, such that a complete surface treatment may be carried out completely automatically and substantially without human intervention. Only the molded parts to be treated have to be introduced into the device V, and after completion of the surface treatment, have to be removed from the device V again. After introduction of the capsule 5 into the capsule mount 20, all parameters and data necessary for the surface treatment are read out from the tags or codes, and are supplied to the control or data processing means. Yet, the surface treatment only has to be started by an operator.

Thereby, a substantially higher throughput is possible for the surface treatment of molded parts compared to the methods known from prior art. Moreover, a qualitatively consistent surface treatment is ensured by the capsule system according to the invention, because the capsule with the surface treatment agent comprised therein may be prefabricated. Correct mixing proportions of the surface treatment agent do not have to be considered, because these are already comprised in the correct mixing proportions in the chambers of the capsules. As far as the mixing proportion of the surface treatment agent and substrate (e.g., water) is concerned, this may also be stored by means of corresponding data in the codes or tags.

A supply opening 9 is provided at the container 25, through which the substrate (e.g., water) may be supplied to the inner space 26 of the container 25. The supply opening has a stop valve. Instead of water, also another substrate may be supplied, as far as it is necessary for the surface treatment. Which substrate has to be supplied may also be stored in the codes or tags of the capsule. At the supply opening 9 or at the supply line coupled to the supply opening 9, a heating means may be arranged, for example, a flow heater, by means of which the substrate supplied to the container 25 may be heated to a certain preset temperature. This preset temperature may also be stored in the codes or tags.

At the bottom of the container 25, a drain 10 with a stop valve is provided, through which the mixture of substrate and surface treatment agent may be drained. For accelerated discharging of the mixture from the inner space 26 of the container 25, the drain 10 may be coupled to a negative pressure suction means.

Further, at the container 25 of the device V, heating and/or cooling means 12 are arranged, in order to cool and/or to heat the container 25. The heating and/or cooling means 12 may also be coupled to the control and/or data processing means, such that also the parameters needed for the control of the heating and/or cooling means 12 may be stored in the codes or tags at the capsule 5. The heating and/or cooling means 12 may comprise heating/cooling sleeves, or a jacket receiving a thermo-fluid.

Further, sensors 13 are provided, by means of which the pressure, the PH value, the temperature, and/or further values to be measured may be measured within the inner space 26 of the device V. These measurement values may, in turn, be supplied to the control and/or data processing means for controlling of the surface treatment.

Figure 3:
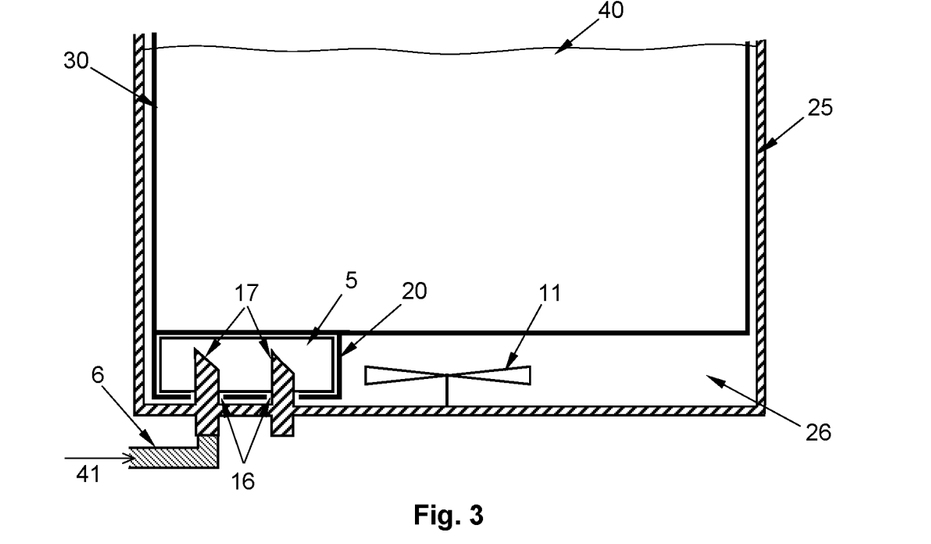
FIG. 3 shows a second embodiment of a device according to the invention.

Further, an agitator is assigned to the container 25. With respect to the embodiment of the invention shown in FIG. 1, the agitator is configured as magnetic agitator 11. Alternatively, also rod agitators or other agitation means or agitation devices may be used, depending in the end on the concrete application and, in particular, on the molded parts to be treated. In FIG. 3, a device according to the invention is shown with an oblique blade agitator.

In the first instance, the agitator is provided for mixing the added surface treatment agent with the substrate.

The agitator may, however, also be used for agitating the substrate—surface treatment agent—mixture during the entire treatment procedure. Thereby, it is avoided that the surface treatment agent is deposited at the bottom of the inner space, or floats on the substrate. An even more consistent surface treatment is ensured.

The device V may comprise a display means, for example, a display, in order to display the current treatment status, e.g., a current dying status or error messages. Alternatively or additionally, also devices similar to traffic lights (e.g., LED illuminating means) or speakers may be provided, in order to signalize, for example, the current treatment status or errors.

According to an embodiment of the device V according to the invention, the latter may comprise cleaning nozzles, in order to clean the container automatically. According to an embodiment, a cleaning nozzle may be provided in the cover, in order to supply rinsing water to the inner space. A cleaning agent may also, however, be supplied via a supply line provided at the side wall of the container 25.

According to an embodiment of the invention, the thus treated molded parts are finally dried, as long as they are still present within the device. For this, after draining the mixture through the drain 10, the inner space 26 may be heated to a predetermined temperature for a predetermined time period. The heating may be monitored by means of a temperature sensor 13. The heating may be controlled such that the temperature follows a predetermined temporal temperature course such that, for example, after a dying procedure or impregnation procedure, it may be avoided that stress cracks are created at the dyed or impregnated surface due to the temperature.

Alternatively, the inner space 26 may also be subjected to warm or heated air, in order to dry the molded parts.

In an embodiment not shown here, the capsule 5 may be arranged outside of the device V. In this case, the outlet openings 5a of the capsule 5 may be coupled to inlet valves provided at the device, e.g., at the first cover 15, via pressure resistant lines. These inlet valves may be coupled to the control and/or data processing means, in order to open and/or close them according to a sequence program. Also according to this embodiment, a gas and/or fluid is applied to the capsule 5 or to the chambers of the capsule 5, in order to introduce the surface treatment agents into the inner space of the container. Here, it may also be beneficial to constantly pressurize the capsule 5 or the chambers of the capsule 5 such that during opening of the corresponding inlet valves, the pressure necessary for introducing the surface treatment agent is already available.

Figure 2:
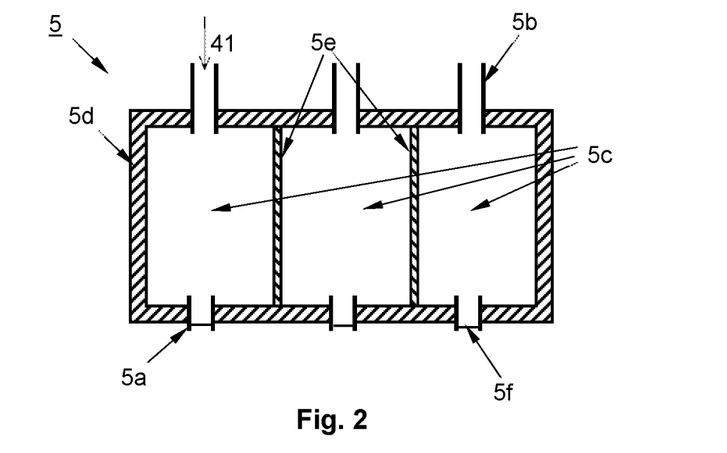
FIG. 2 shows an embodiment of a capsule according to the invention for use in a device according to the invention.

FIG. 2 shows an example of a capsule 5 according to the invention.

The capsule 5 consists of a preferably pressure resistant housing 5d, in which here, three chambers 5c are formed. The three chambers are respectively separated from each other by a chamber wall 5e in a pressure-, fluid-, and air-tight manner. An inlet opening 5b and an outlet opening 5a are assigned to each one of the three chambers. The inlet openings 5b may be configured as coupling parts, to which a pressure tube may be connected. The outlet openings 5a may comprise locking means 5f. By means of the locking means 5f, the time may be controlled at which the surface treatment agent contained in the respective chambers 5c is supplied to the inner space 26 of a device V according to the invention.

The locking means may be configured, for example, as check valves or as a membrane such that they open automatically at an overpressure prevailing in the respective chambers 5c. Alternatively, also active locking means may be provided, as magnetic valves, by means of which the outlet openings 5a can be opened or closed independently of the pressure in the chambers.

The codes or tags described above are arranged at the housing.

The capsule preferably is provided as recyclable capsule, which may be refilled after use, for example, by a service provider.

FIG. 3 shows a lower portion of the device according to the invention in cross-section according to a further embodiment. Also, with respect to the configuration shown here, the container 25 is closed by a cover, wherein the cover, however, has no further or no second cover at all.

A basket 30 is arranged in the inner space 26 of the container 25, in which the molded parts to be treated are received. The basket may be configured as a lattice basket.

At the bottom of the container 25, an agitator is arranged, which here is configured as an oblique blade agitator, and which is provided for mixing the surface treatment agents with the substrate.

In contrast to the configuration shown in FIG. 1, here, the capsule mount 20 itself may also have the structure of a lattice basket 30, i.e., it may be configured as a lattice box.

As far as the capsule mount 20 is configured as a housing, at the bottom of the housing at least one opening 16 is provided, through which the nozzles 17 described in the following may be advanced towards the capsule 5, which is arranged in the capsule mount. With respect to the configuration shown here, the capsule mount 20 is arranged at the bottom-sided outer surface of the basket 30.

At the bottom of the container 25, an application means is provided by means of which a gas and/or fluid 41 may be applied to the chambers of the capsule 5. The application means is configured as a number of nozzles 17, which are arranged substantially perpendicular to the bottom of the container 25, and which project into the inner space 26 of the container 25 over a certain length. The length of the nozzles 17 may be dimensioned such that the latter may penetrate into the interior of the capsule after introducing the basket 30 with the capsule 5 arranged thereon, as can be seen in FIG. 3.

At the underside of the container 25, ports may be provided, in order to connect one or more supply lines 6 to the nozzles. The gas and/or fluid are/is supplied via these supply lines 6 to the nozzles. The supply lines preferably are not coupled to a compressor not shown here, in order to introduce the gas and/or fluid in a pressurized manner into the capsule 5.

The functioning of the nozzles 17 and the interaction with the capsule 5 are further described with reference to FIG. 5.

In order to correctly position the capsule 5 arranged within the capsule mount 20 above the nozzles, it is preferable to provide the basket with guide rails running perpendicular, which correspond to guide rails provided at the inner wall of the container. Preferably, the guide rails are arranged at the basket and at the inner wall such that the basket 30 only can be inserted in a radial orientation into the inner space 26 of the container 25. Further, the guide rails are arranged with respect to the capsule mount 20 such that during introducing of the basket 30 into the inner space, it is located exactly above the nozzles 17.

Figure 4:
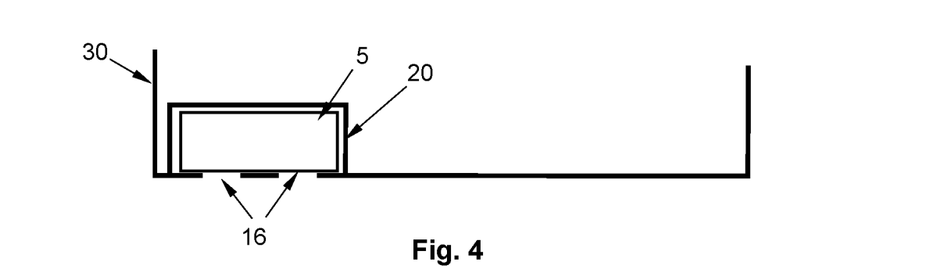
FIG. 4 shows an alternative embodiment of a basket with a capsule mount.

FIG. 4 shows an alternative configuration of the lower portion of the basket 30. The basket 30 itself, here, may also be configured as a lattice basket. In contrast to the configuration shown in FIG. 3, the capsule mount 20 is not arranged at the bottom-sided outer surface of the lattice basket 30, but rather at the bottom-sided inner surface of the lattice basket such that the capsule mount 20 protrudes into the interior of the lattice basket. Alternatively, the capsule mount 20 may also be arranged at the bottom of the lattice basket such that it partially protrudes into the interior of the basket, and partially projects at the underside of the basket.

Also with respect to the configuration of the basket 30 shown in FIG. 4, the capsule mount 20 has at least one opening 16 at the underside, through which the nozzles can be advanced towards the capsule 5.

With respect to all capsule mounts shown above, the latter are configured such that the capsule is replacably arranged within the capsule mount.

Further, all capsule mounts shown above may be configured such that several capsules may be arranged therein. Thus, instead of the capsule 5 shown in FIG. 2 with three chambers 5c, three capsules 5 with respectively one chamber 5c may be arranged in the capsule mount.

Figure 5:
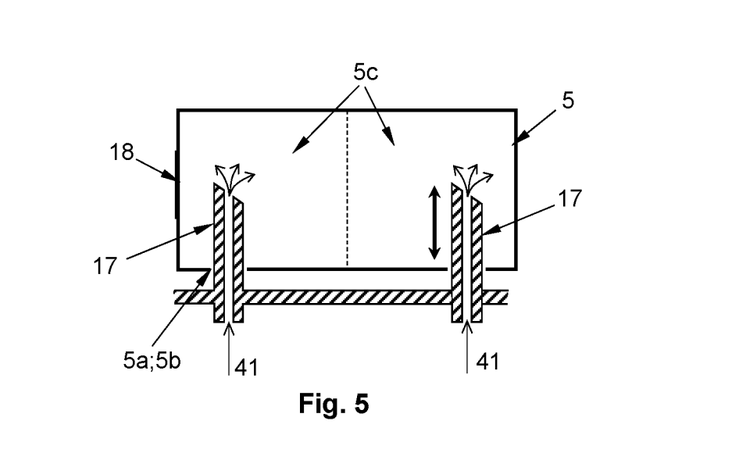
FIG. 5 shows an example of a capsule according to the invention with nozzles of an application means inserted.

FIG. 5 shows an example of a capsule 5 according to the invention with nozzles 17 of an application means inserted.

The capsule 5, which is arranged within a capsule mount 20 of the basket 30, is set on the upper ends of the nozzles 17 by lowering of the basket into the inner space 26.

By further lowering of the basket 30, for example, during closing of the cover 15, the bottom of the capsule 5 is pierced by the nozzles 17. Thereby, the inlet openings 5a are formed in the bottom of the capsule 5, through which the nozzles 17 protrude into the chambers 5c of the capsule. In order to facilitate the piercing of the bottom, blades or the like may be provided at the tips of the nozzles.

The nozzles 17 and/or the bottom of the capsule are configured such that the nozzles 17 arranged in the inlet openings 5a do not close the inlet openings pressure- and fluid-tightly. Thereby, it is ensured that the surface treatment agent received in the capsule cannot escape from the capsule.

After the nozzles 17 have pierced the capsule wall and protrude into the interior of the capsule, gas and/or fluid 41 are/is supplied to the nozzles 17 via a supply line 6. The gas and/or fluid then escape/escapes from the interior of the nozzle ends arranged within the capsule. By this application of the gas and/or fluid to the capsule chambers 5c, a displacement process takes place in the interior of the capsule, which allows the surface treatment agent to escape from the capsule through the inlet openings 5c. The inlet openings 5a thereby at the same time also serve as outlet openings 5b.

According to an embodiment of the invention, one or more nozzles may be configured so as to be movable in axial direction, as indicated in FIG. 5 by the double arrow for the nozzle on the right-hand side. Thus, after piercing the bottom, the nozzle may be advanced out of the capsule 5 completely or partially along its longitudinal axis. In this case, the nozzle may be operated in a function-less manner, i.e., only as tip for piercing the bottom, without gas and/or fluid being supplied to the capsule via it. In case the nozzle is advanced out of the capsule completely, an outlet opening 5b is created, the diameter of which substantially corresponds to the diameter of the nozzle. In case only one of the nozzles 17 arranged within the chamber is advanced outwards, and gas and/or liquid is supplied to the chamber via the nozzle remaining in the chamber, the surface treatment agent may also escape through a comparatively large outlet opening.

According to a further embodiment, the axially displaceable nozzle may be advanced upwards until it is able to pierce the cover of the capsule. After the piercing of the cover of the capsule, the nozzle may be advanced downwards that far such that, on the one hand, the hole in the cover is cleared completely and, on the other hand, the tip of the nozzle is still within the interior of the capsule. Thereby, additional outlet openings may be created, through which the surface treatment agent may escape into the inner space 26 of the container 25.

The gas and/or fluid 41 preferably are/is supplied to the chamber 5c in a pressurized form. The pressure, hereby, is selected such that it is larger than the internal pressure of the container. Thereby, it is ensured that the surface treatment agent escapes into the inner space of the container. In case a fluid, for example, water is supplied to the chamber 5c, the chamber virtually is rinsed.

Here, a code 18, as a barcode or an RFID tag, is arranged at the lateral outer wall of the capsule 5. Corresponding to this, a corresponding reading means may be arranged at the lateral inner wall of the container 25. The functioning and use of the reading means and of the code 18 have already been described above.

Figure 6:
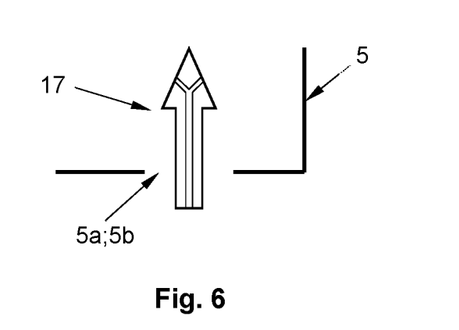
FIG. 6 shows an alternative embodiment of a nozzle.

FIG. 6 shows an alternative configuration of a nozzle 17. The nozzle, here, is formed in the shape of an arrow, wherein the front end is wider than the shaft. Such a configuration (wide tip and thin shaft) has the advantage that after the complete penetration of the tip into the chamber of the capsule, an outlet opening 5b is available, the diameter of which substantially corresponds to the diameter of the tip, and thereby is substantially larger than the diameter of the shaft.

Figure 7:
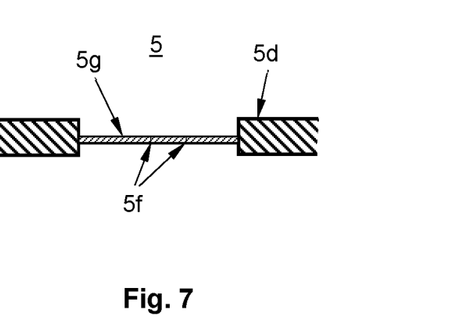
FIG. 7 shows a detailed view of a capsule according to the invention in the area of the inlet/outlet openings.

FIG. 7 shows a detailed view of the capsule 5 according to the invention in the area of the inlet/outlet openings 5a, 5b.

In the area of the inlet/outlet openings 5a, 5b at the bottom of the capsule 5, an opening or piercing area 5g is defined, which is pierced by the tip of the nozzle 17. This piercing area 5g may be configured such that the wall thickness is lower than the wall thickness of the remaining capsule housing. The material of the piercing area 5g, hereby, may be the same as the material of the remaining capsule housing.

According to an embodiment, the piercing area 5g may also comprise another material than the remaining capsule housing. Preferably, a soft material is provided for the piercing area 5g, while for the remaining capsule housing, a rigid material is provided. For example, the piercing area 5g may be formed rubber-like such that an easy piercing by means of the nozzle is ensured. In case the rubber-like piercing area 5g is under tensile stress, material may contract after the piercing, whereby the diameter of the outlet opening is enlarged.

According to an embodiment, one or more predetermined breaking points 5f may be provided in the piercing area 5g also facilitating the piercing by means of the nozzle. The predetermined breaking points, hereby, may be provided independently of the material used for the piercing area 5g.

Figure 8:
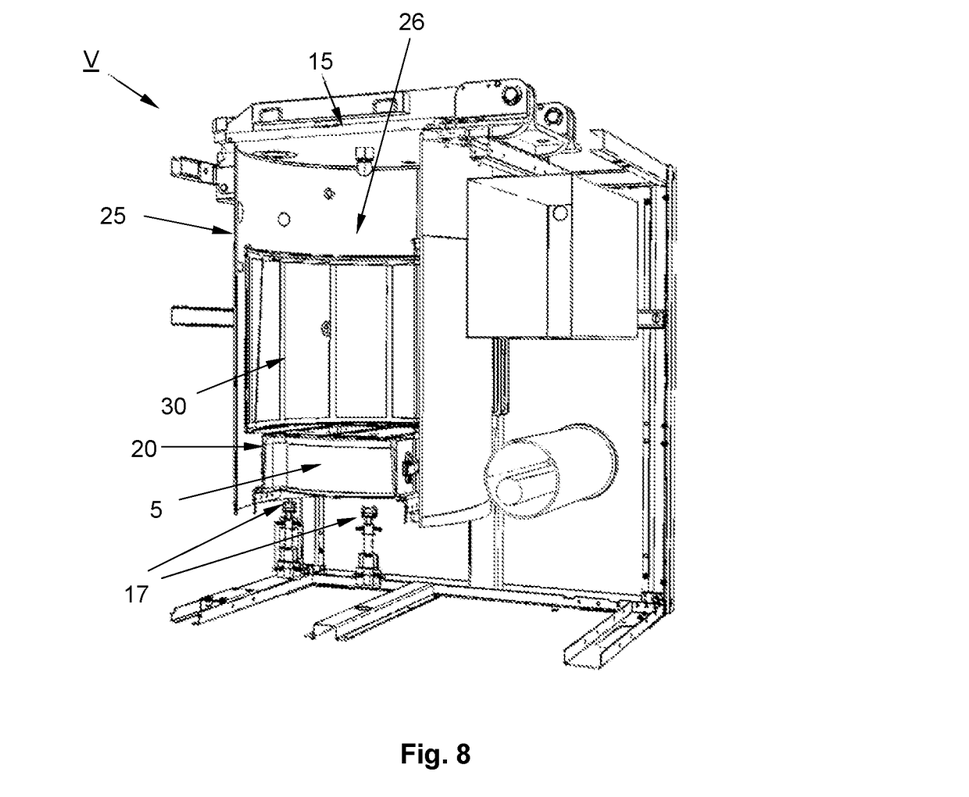
FIG. 8 shows a sectional view through a concrete embodiment of the invention.

FIG. 8 shows a concrete implementation of the device according to the invention in sectional view, wherein components of the device which are not relevant for the invention are not shown.

Here, in particular, the container 25 with the basket 30 arranged therein can be seen, as well as two nozzles 17 arranged at the bottom of the container 25. The nozzles 17 are displaceable axially, in order to pierce the bottom of the capsule 5, and to supply gas and/or fluid to the inner space of the capsule.

It has been shown that the device V according to the invention is particularly suitable for surface treatment, e.g. dying and/or impregnating of molded parts, which are produced in a powder-based manufacturing or printing process (3D printing process).

Thus, for example, a first chamber of the capsule 5 may comprise an agent for pre-treatment of the molded parts, e.g. Albegal. A second chamber may comprise a dye agent mixture from dye and possible additives, for example, for subsequent dying of the molded parts. A third chamber may comprise an agent for post-treatment of the molded parts, again e.g. Albegal. The post-treatment may also comprise an impregnation of the molded parts such that in the third chamber, a corresponding impregnation agent may be comprised. Accordingly, according to this exemplary application, the gas and/or fluid is applied to the three chambers of the capsule 5 according to the sequence described above, in order to introduce the respective treatment agents present in the chambers in this sequence into the inner space 26 of the device V.

During treatment of the molded parts, an overpressure or a negative pressure may be applied, as needed, to the inner space. Thus, during impregnation of the molded parts it may be preferable to initially apply a negative pressure to the inner space after introducing the molded parts to the impregnated, and when the negative pressure is prevailing, to introduce the impregnating agent from the capsule and the substrate. After introducing the impregnation agent and the substrate, an overpressure may then be applied to the inner space such that impregnation agent is also pressed into the smallest pores of the molded parts.

REFERENCE NUMERALS

V device for surface treatment
1 locking means for the large cover 15
2 locking means for the small cover 4
3 sealing ring between container 25 and large cover 15
4 second (small) cover (if needed, with integrated pneumatic connector)
5 cartridge or capsule with at least one, preferably, three chambers
5a outlet openings (e.g., outlet valves)
5b inlet openings (e.g., inlet valves)
5c chambers of the capsule 5
5d pressure resistant and fluid-tight housing of the capsule 5
5e chamber walls of the capsule 5
5f locking means (e.g. check valve)
5g opening or piercing area in the capsule wall or at the capsule bottom
6 tubes, e.g., pressure tubes or pneumatic valves and tubes for ignition (activation) of the chambers of the capsule 5
7 compressor for applying an overpressure to the chambers of the capsule 5
8 valve for creating a negative pressure
9 fluid supply, in particular, water supply including stop valve
10 drain including stop valve
11 agitator, e.g., magnetic agitator and corresponding magnets or oblique blade agitator
12 heating means (e.g., heating sleeves at the wall of the container 25)
13 temperature sensor
14 sealing ring between capsule 5 and capsule mount 20
15 first (large) cover with capsule mount 20
16 opening in the capsule mount 20
17 nozzles for introducing a gas and/or a fluid into the chamber(s) 5c of the capsule 5
18 code, e.g. barcode, QR code, NFC or RFID tag attached to the capsule 5
20 capsule mount or capsule holder, e.g. in the cover 15 or at the basket 30
25 container
26 inner space of the container 25 or the device V
30 basket for receiving the molded parts
40 fluid, e.g. water, in the inner space 26 of the container 25
41 gas and/or fluid, which is introduced into the chamber(s) 5c of the capsule 5

The invention claimed is:

1. A device (V) for surface treatment of molded parts, comprising
a container (25) for receiving a number of molded parts to be treated,
a first cover (15), wherein the container (25) is closable with the first cover (15) in a pressure-, fluid-, and/or air-tight manner, and
an arrangement for introducing liquid and/or pulverized surface treatment agents into an inner space (26) of the closed container (25), wherein
the arrangement comprises a capsule (5) and an application means, wherein the application means comprises nozzles,
the arrangement further comprises a capsule mount (20) for receiving the capsule (5), wherein the capsule mount (20) comprises at least one opening (16), through which the surface treatment agents to be introduced pass from the capsule (5) into the inner space (26) of the container (25),
the surface treatment agents to be introduced are received within the capsule (5), and
the application means can be coupled to the capsule (5), in order to apply a gas and/or fluid (41) to at least one chamber (5c) formed in the capsule (5), in order to bring the surface treatment agent received in the capsule into the inner space (26) of the container (25),
a basket (30) for receiving the molded parts which is introducible into and removable from the inner space (26) of the container (25),
wherein the capsule mount (20) is arranged at the basket (30) and wherein the capsule (5) arranged at the capsule mount (20) such that the capsule
is advanced towards the application means during introducing of the basket into the container (25), or
is pressed against the application means during introducing of the basket into the container (25), and
wherein the capsule (5) is configured such that pressing against the nozzles (17) effects a penetration or a piercing of a wall of the capsule (5).

2. The device according to claim 1, wherein the capsule (5) is arranged in the inner space (26) of the container (25).

3. The device according to claim 1, wherein the application means comprises at least one supply line (6), in order to supply the gas and/or fluid (41) to the at least one chamber (5c) of the capsule (5), wherein the supply line (6) is guided through the wall of the container (25) or through the first cover (15) into the inner space (26) of the container.

4. The device according to claim 3, wherein
the nozzles are coupled to the at least one supply line (6), and
wherein the nozzles are adapted to penetrate through or pierce a wall of the capsule (5) when the capsule is pressed against the nozzles.

5. The device according to claim 1, wherein the capsule mount (20) is configured as capsule container with the at least one opening (16).

6. The device according to claim 1, wherein the pressing of the capsule (5) against the nozzles (17) is effected by the first cover (15) when the cover is closed.

7. The device according to claim 1, wherein the application means comprises a compressor (7), which is coupled to the capsule (5) in order to introduce the gas and/or the fluid under a pressure into the inner space of the capsule (5), which is greater than the internal pressure of the container (25).

8. The device according to claim 1, wherein at least one nozzle (17) is configured so as to be movable in an axial direction.

9. The device according to claim 1, wherein the device comprises
a fluid supply (9), via which a fluid is introducible into the inner space (26), wherein a stop valve is assigned to the fluid supply (9), and/or
a vacuum pump for applying a negative pressure and/or a compressor for applying an overpressure to the inner space (26).

10. The device according to claim 1, wherein the device comprises a drain (10), in order to empty the inner space (26).

11. The device according to claim 1, wherein a heating or cooling sleeve, is assigned to the container (25) for heating and/or cooling the inner space (26).

12. The device according to claim 1, wherein the device comprises an agitator (11).

13. The device according to claim 1, wherein the application means is adapted to apply the gas and/or fluid to a number of chambers (5c) formed in the capsule (5) separately and independently of each other.

* * * * *